March 12, 1935.   F. WHITE   1,994,329
AIR CONDITIONING APPARATUS
Filed Dec. 9, 1933   2 Sheets-Sheet 1
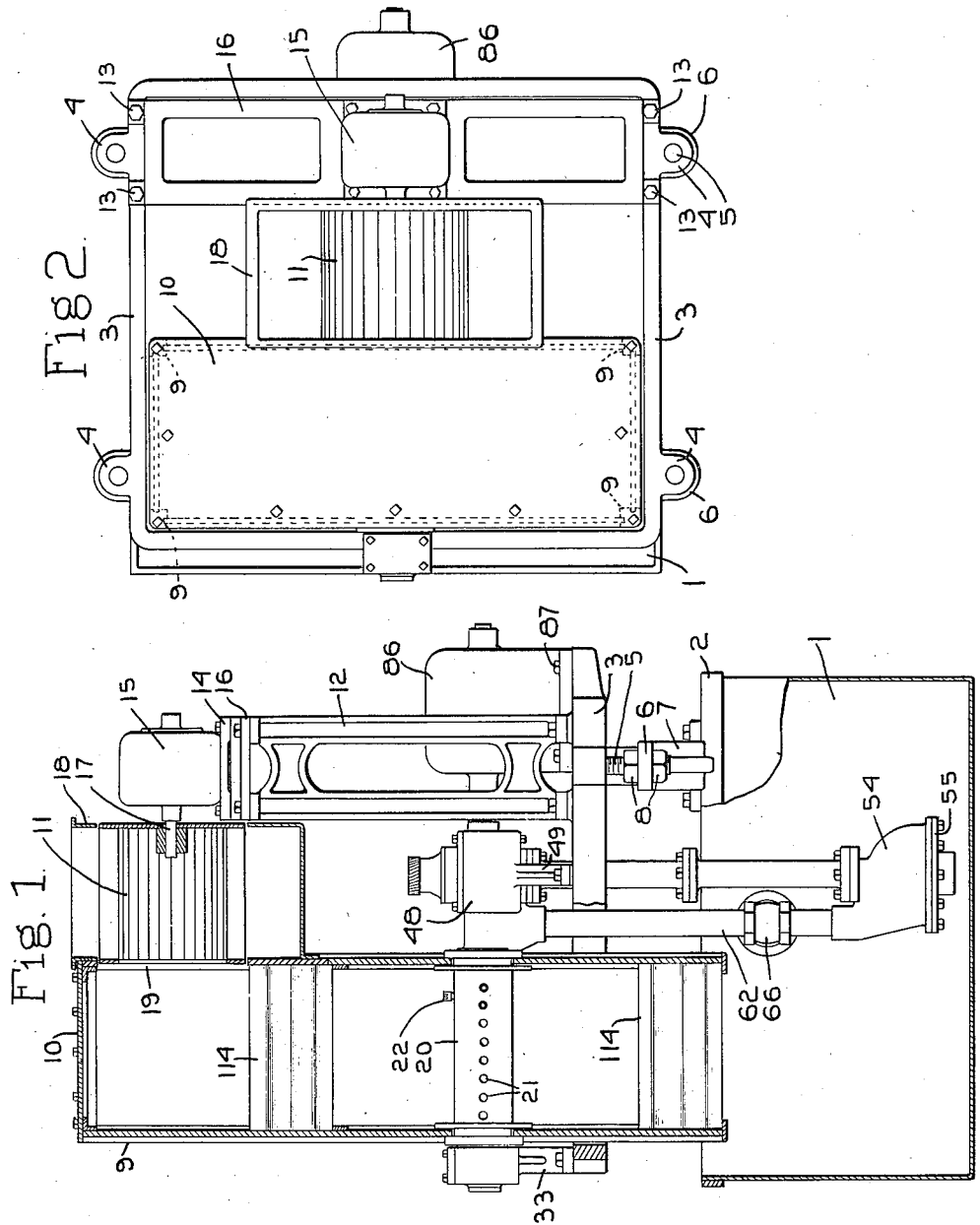
Inventor.
Frederick White deceased
by Lena A. White executrix
by Heard Smith & Tennant.
Attys March 12, 1935.　　　　　F. WHITE　　　　　1,994,329
AIR CONDITIONING APPARATUS
Filed Dec. 9, 1933　　　2 Sheets-Sheet 2
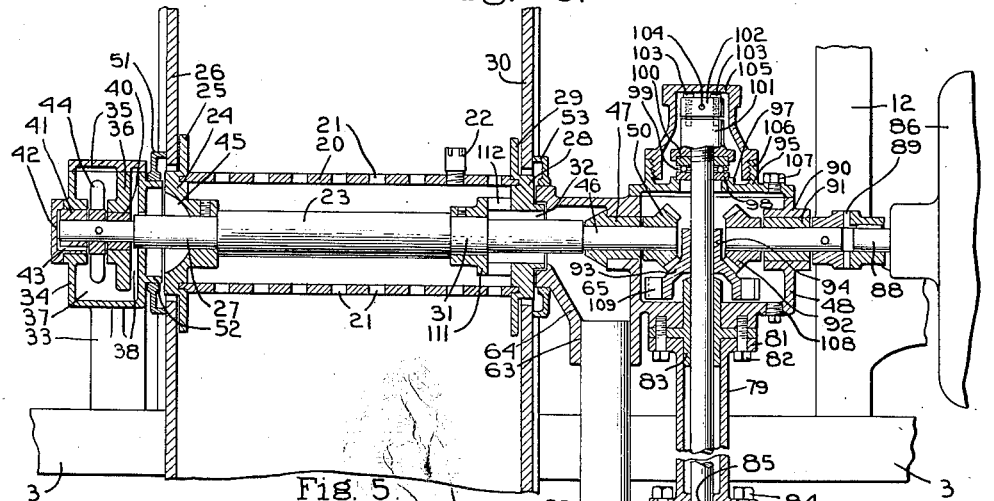
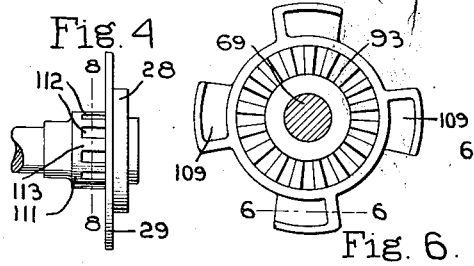
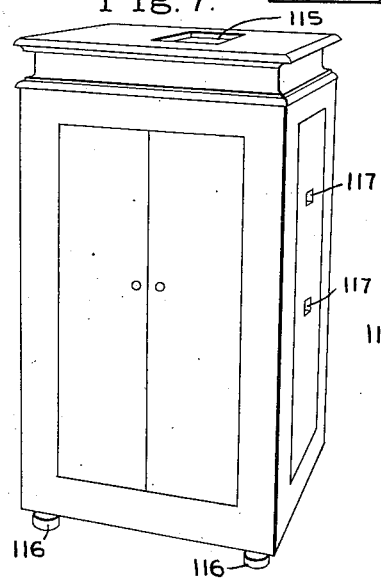
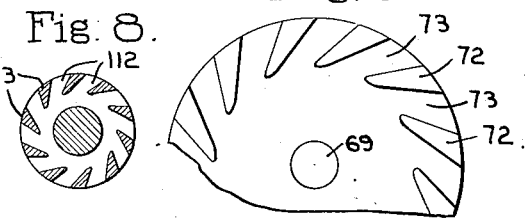
Inventor.
Frederick White deceased
by Lena A. White executrix
by Heard Smith & Tennant
Attys.

Patented Mar. 12, 1935

1,994,329

UNITED STATES PATENT OFFICE 1,994,329

AIR CONDITIONING APPARATUS

Frederick White, deceased, late of Newton, Mass., by Lena A. White, executrix, Newton, Mass.

Application December 9, 1933, Serial No. 701,659

18 Claims. (Cl. 261—90)

This invention relates to an apparatus for the conditioning of air having a chamber within which water is rapidly discharged in a relatively large volume in such a manner as to fill the chamber with what resembles a violent rainstorm and through which the air to be conditioned is forced at a rapid rate. The object and result of this operation is thoroughly to wash and purify the air removing therefrom dust, bacteria, and other impurities and at the same time to impart to the cleansed air a required temperature and himidity.

While the apparatus is thus conveniently described as for the conditioning of air by the removal of the impurities therein and by the imparting thereto of a required temperature and humidity all through the use of water, it is to be understood that by these terms the invention in its broader aspects includes the conditioning of other gases than air and the use of other liquids than water whenever the apparatus as disclosed herein is suitable and available therefor.

But as the primary purpose of the invention has to do with the conditioning of air, and more particularly for the conditioning of air in rooms or enclosures occupied by animals and primarily by human beings so as to maintain the air therein in a condition suitable for comfort and well-being, the invention is described particularly with reference thereto.

In its preferred embodiment illustrated, the invention is embodied in a unitary or self-contained apparatus of a size suitable for use in the conditioning of the air of a room or dwelling but it will be recognized that in the broader aspects of the invention the size of the apparatus and the location of it or its main elements will depend upon the conditions of its use and may be widely varied within the scope of the invention.

The apparatus essentially presents a chamber through which the air is drawn as it is conditioned and a hollow rotary distributor located within this chamber to which the conditioning liquid or water is fed and from which it is rapidly and violently discharged to produce within and filling the chamber the dense and violent rainstorm effect referred to.

The principal object of the invention is to provide an efficient and practical means for supplying the liquid or water to the distributor so that when in operation it will maintain a continuous and uniform character of discharge throughout and consequently a uniform condition throughout the chamber.

A further object of the invention is to provide such an apparatus in which the water supplied to the distributor is taken from a supply tank located beneath the chamber and into which it is discharged from the chamber so that a continuous circulation is maintained and a given volume of water used over and over again, thus enabling the apparatus to be a self-contained unit.

More specifically the invention has for its object to provide such an apparatus in which the water supply tank is located beneath the conditioning chamber with a conduit extending from a point adjacent the bottom of the tank to the distributor and with a centrifugal pump located below the water level at the lower end of the conduit and with a centrifugal booster pump located at the end of the conduit discharging into the distributor whereby the water in the required volume is raised from the tank, forced throughout the distributor, and discharged with uniform velocity and in uniform quantity throughout the discharge area of the distributor so as to produce the required uniform condition of rainstorm effect throughout the entire conditioning chamber.

In order to produce the required results, the distributor and the means for raising the water from the supply tank and forcing it into the distributor necessarily rotate and operate at high speed and consequently require efficient lubrication. But as the very object of the invention is to purify the air in the conditioning thereof, it is essential that the lubricating substance shall be kept from entering the air-conditioning chamber. The invention therefore has as a further object the provision of means for preventing the lubricant from being admitted with the water or otherwise carried into or reaching the air-conditioning chamber.

A further object of the invention is to provide a self-priming construction, thus enabling the apparatus readily to be stopped and started as may be required without further attention.

These and other objects and features of the invention will appear more fully from the accompanying description and drawings and will be particularly pointed out in the claims.

In the simple and preferred form of the invention illustrated, it is shown as designed for and embodied in a self-contained unit such as suitable for use in the conditioning of the air in a room or dwelling of human habitation. In this form the entire apparatus is conveniently enclosed in a cabinet which may be made of any suitable material and design to harmonize with the surroundings.

In the drawings:

Fig. 1 is a front elevation partially in vertical cross section and partially broken away of the entire apparatus.

Fig. 2 is a top plan view of the construction shown in Fig. 1.

Fig. 3 is a view in front elevation largely in vertical cross section and partially broken away of the main elements of the apparatus.

Fig. 4 is a side elevation of the booster pump element.

Fig. 5 is a top plan view of an agitator element.

Fig. 6 is a detail in cross section taken on the line 6—6 of Fig. 5.

Fig. 7 is a perspective view of a simple form of cabinet enclosing the entire apparatus.

Fig. 8 is a view in cross section of the booster pump taken on the line 8—8 of Fig. 4.

Fig. 9 is a view in transverse cross section of the impeller of the main centrifugal pump.

In the self-contained construction illustrated, the supply of water or other fluid is contained in a tank located at and forming the bottom of the apparatus. This tank 1 is preferably of rectangular shape and of a horizontal area approximately equal to the horizontal area of the entire apparatus which is supported above it. The tank is preferably made of metal and of sufficient rigidity to form a support for the apparatus and is shown as provided at the top with a heavy metal rib 2.

The man elements of the apparatus are supported from a substantially rectangular rigid metal frame 3. This frame is shown as provided with a plurality of laterally projecting bosses 4, each of which has mounted therein a depending screw 5. These screws, respectively, extend through arms 6 on brackets 7 bolted to the rib 2 of the tank. Nuts 8, in each case one above and the other below the bracket arm 6, are threaded upon the screw 5. Thus by adjusting the various nuts the supporting frame 3 is readily brought into a level position and at the same time firmly mounted upon its support.

The air-conditioning chamber of the apparatus is shown as located at the left-hand side and of rectangular shape. Vertical corner brackets 9 extend through the frame 3 and are rigidly secured thereto. The four side walls of the chamber are formed by plates of metal, glass, or other suitable material between these corners posts and a top cover plate 10 is secured in place at the top of the side walls. The bottom of the chamber which is located within the area of the tank 1 and preferably extends slightly into the tank is left open. But the details of construction of the chamber are unimportant.

The forced passage of the air through the air-conditioning chamber is shown as effected by a suction fan 11 of the squirrel cage type. For this purpose an axially rectangular skeleton frame 12 extends upward at the right-hand side of the apparatus and is bolted at 13 to the frame 3. The base 14 of an electric motor 15 is bolted to the top plate 16 of this auxiliary frame and the shaft 17 of the motor is extended and supports the suction fan 11. This suction fan is located within a rectangular casing 18 mounted between the side wall of the air-conditioning chamber and the auxiliary frame 12. This casing 18 is open at the top and has an opening in its left-hand side wall in line with the fan coinciding with an opening 19 in the right-hand side wall of the air-conditioning chamber.

It will thus be seen that the air to be conditioned enters through the open bottom of the air-conditioning chamber, passes vertically upward therethrough, is drawn out through the opening 19 by the suction fan, and discharged from the apparatus through the upper open end of the fan casing 18.

The water, as already pointed out, is discharged into the air-conditioning chamber by means of a hollow cylindrical distributor rotating at high speed. This distributor extends centrally and transversely of the chamber the full width thereof. The cylindrical wall 20 made of suitable metal is provided throughout its area with closely spaced radially extending apertures 21. These apertures may be formed directly in the wall of the distributor or may extend through nipples 22 screwed into the wall. The size and spacing of the apertures through which the water is discharged are such, however, as to insure the water being discharged in drops and broken up streams as contradistinguished from an atomized condition so as to produce throughout the chamber the violent, dense rainstorm effect. The distributor is secured to a central shaft 23. The left-hand end of the distributor is closed by a head 24 having an annular flange 25 extending up close to the inner surface of the plate 26 of the side wall of the chamber and having a hub fitting over and secured to a reduced section 27 of the shaft. The right-hand end of the distributor is provided with a head 28 having a similar flange 29 extending adjacent the inner surface of the plate 30 of the side wall. This head likewise fits over and is secured to a reduced section 31 of the shaft. The booster pump, to be described later, is here combined with this head of the distributor and the head presents an annular central intake opening 32 to the distributor surrounding the shaft.

The shaft 23, to which therefore both the distributor and the booster pump are secured and by which they are simultaneously rotated, is supported at its left-hand end by a bearing box on a bracket 33 mounted on the frame 3. The bearing box comprises a casing 34 secured to or forming a part of the bracket 33 and a removable cover 35. The casing 34 is divided into two vertical chambers by the partition wall 36 extending nearly to the bottom of the casing so that these two chambers 37 and 38 are in communication at the bottom. The portion 27 of the shaft passes through the side wall of the casing and extends into the chamber 38. Beyond this the shaft has a further reduced section 39 journalled in bearings 40 and 41 secured in the partition 36 and the farther side wall of the casing, respectively. The bearing 41 extends around the end of the shaft section 39 and presents a chamber 42 opposite the end of the shaft section connected by a bore 43 with the chamber 37. An agitator having the radial blades 44 is secured to the shaft section 39 between the bearings 40 and 41. Lubricant is supplied to the bearing casing and thoroughly distributed thereby to the bearing surfaces of the shaft section 39. At the same time it is forced into the chamber 42 and thus serves to cushion and oppose the end thrust of the shaft. Since the chamber in which the agitator is located only communicates with the chamber 38 through the small opening at the bottom of the partition 36, the lubricant is largely quiescent in the chamber 38 and the rapid rotation of the shaft throws the lubricant therefrom by centrifugal action in the chamber 38 so that there is little tendency for the lubricant to creep to the right along the section 27 of the shaft. But the tight fit of the head 24 of the distributor and its position abutting the shoulder between the shaft section 27 and the main portion of the shaft 23 prevents lubricant from entering the distributor and mingling with the water. This is further guarded against by the recess 45 formed in the distributor head.

The right-hand end of the distributor and booster pump shaft presents a reduced section 46 having a bearing in a bushing 47 mounted in the gear box 48 supported on the bracket 49 secured to the frame 3 and this shaft section has secured at its right-hand end the bevelled pinion 50 by which the shaft is rotated.

The flanges 25 and 29 of the distributor heads revolve close to the inner walls of the air chamber and act to prevent any material amount of water escaping through the openings in the side walls in which the distributor rotates. In addition water seals are provided at each exterior face of the side walls of the chamber. At the left-hand side such a seal is shown as an annular cup-shaped washer 51 having a driving fit on an annular flange 52 projecting from the casing 34 and having its peripheral surface seated tightly against the wall of the air-conditioning chamber. A similar sealing washer 53 is similarly mounted at the opposite side.

The water or other liquid employed in the conditioning operation is taken from the bottom of the tank 1 and forced through a conduit extending from a point adjacent the bottom of the tank to the annular intake opening 32 of the distributor head. At its lower end this conduit is formed in a casing having a dome-shaped top portion 54 and a horizontal bottom plate 55 bolted thereto at 56. The bottom plate is provided with a depending annular flange 57 presenting a central intake opening 58. At one side the dome-shaped top 54 of the casing presents an upwardly extending boss 59 having a large frusto-conical bore 60. This boss terminates in a vertical tubular section 61 in which is secured a pipe 62 which extends vertically upward and at its upper end is secured in a similar tubular section 63 extending downward from an extension 64 of the gear box structure 48. This extension 64 presents a chamber 65 forming the upper end of the conduit and opening directly opposite and into the annular opening 32 of the distributor head. The walls of this chamber, which include the projecting end of the bushing 47, are shaped so as smoothly to divert the flow of water from the pipe 62 into the annular opening 32.

A valve 66 operated by a hand wheel 67 is conveniently located at a medial point in the pipe 62 to adjust or to shut off the flow of water through the conduit when desired.

The main pump by which the water is taken from the tank and forced upward through the conduit is of the centrifugal type. The impeller of this pump is provided with a vertical hub 68 secured to the lower end of the vertical pump shaft 69 and comprises the parallel annular disks 70 and 71 and the interposed curve wedge-shaped peripherally spaced blades 72 forming therebetween the discharge ports 73. The central opening of the annular disk 71 coincides with the intake opening 58. The lower disk 71 of the pump impeller fits within an annular recess in the top of the bottom plate 55 and the upper disk 70 fits closely within a recess in the bottom of a horizontally extending bridge or back pressure guard 74 formed on the lower end of a bearing sleeve 75 for the pump shaft. This sleeve has a driving fit in a boss 76 extending upward from the center of the dome-shaped top 54. The periphery of the bridge or back pressure guard 74 is spaced from the inner wall of the dome and this bridge or back pressure guard is accurately positioned parallel with and at just the required position from the bottom plate 55 to allow for the location of the pump impeller.

It will thus be seen that when the impeller is rapidly rotated, it acts to draw the water through the intake opening 58 and expel it through the peripheral ports 73 of the impeller and thence upward, through the annular space between the opposed similar curved surfaces 77 of the bottom plate and 78 of the periphery of the bridge plate, into the chamber formed between the bridge plate and the dome-shaped top 54. This chamber shaped as illustrated acts as a whirlpool or quieting chamber from which through the bore 60 described the water is continuously forced upward through the pipe 62. Thus the water raised through the intake opening 58 by this centrifugal pump is delivered in large volume at right angles to the pump shaft through the ports 73, diverted into the chamber between the dome and the bridge or back pressure guard 74 and thence forced vertically upward parallel with the pump shaft through the pipe 62.

It will be noted that the impeller is positioned well below the water line, it being intended that the tank shall be maintained substantially full of water. Thus the pump is self-priming and acts immediately whenever set in motion to effect the pumping operation and force the water upward through the pipe 62. Consequently the discharge of water into the distributor for conditioning the air is started and stopped simply by starting and stopping the rotation of the centrifugal pump.

The gear box 48 and the boss 76 of the pump casing are connected by a vertical tubular casing 79 surrounding the pump shaft 69. At the lower end this casing is flanged and bolted at 80 to a flange on the boss 76 and at its upper end is flanged at 81 and bolted at 82 to the gear box structure. Between the flange 81 and the lower wall of the gear box is interposed the flange of a cylindrical bushing 83 for the upper section of the shaft. The tubular casing 79 may be divided into two sections, as shown, flanged and bolted together at 84 with the flange portions presenting an intermediate internal bearing 85 for the shaft.

The distributor and booster pump shaft 23-46 and the main pump shaft 69 are simultaneously driven at high speed and preferably, as shown, from an electric motor 86 bolted at 87 to the frame 3. The shaft 88 of this motor has a suitable universal connection 89 with a stub shaft 90 journalled in a bushing 91 in the right-hand wall of the gear box and axially aligned with the distributor and booster pump shaft. This stub shaft 90 has mounted on its inner end a bevelled pinion 92 similar to the pinion 50 and these pinions within the gear box mesh with a bevelled pinion 93 having a hub 94 secured to the main pump shaft 69.

It is highly important that the impeller of the main pump shall be accurately adjusted and maintained under all conditions in free running position closely adjacent to the bottom of the back pressure guard 74 and the top of the bottom plate 55 and that the downward thrust on the impeller due to the weight of the parts, the column of water in the conduit and the suction required to lift the water through the intake shall be offset or counterbalanced during the operation of the pump. While the back pressure guard or bridge plate 74 assists in offsetting the downward thrust, a very accurately adjustable and efficient thrust bearing is provided at the upper end of the pump shaft. This bearing is supported by a rigid cover plate 95 removably secured to the gear box 48. This cover plate presents an annular boss 97 spaced from and surrounding the pump shaft 69. On this boss is seated an anti-friction washer 98. On top of the washer 98 is seated a ball bearing ring 99 and on top of the ball bearing ring a second washer 100 is seated. A nut 101 is threaded on the shaft 69 and provided with a cup-shaped lower end seated over the washer 100. A lock nut 102 is threaded on the upper end of the shaft and has threaded therein vertical screws 103 adapted to enter holes or depressions in the top of the nut 101. In adjusting the pump shaft the nut 101 is turned until the impeller is brought into exactly the required vertical position. Then the lock nut 102 is turned until the screws align with the holes in the nut 101. Then these screws are screwed down into the holes and finally a hole is drilled radially through the lock nut and the shaft and a pin 104 inserted. Thus a very accurate adjustment is obtained and also accurately retained under all conditions, any new adjustment requiring the removal of the pin 104.

The entire bearing for the upper end of the pump shaft is enclosed by a cap 105 having threaded engagement with an annular boss 106 on the cover plate 95.

The chamber of the gear box within which the pinions are mounted is filled with lubricant by removing the filling plug 107 and may be drained off by removing the draining plug 108. In order that the lubricant shall be thoroughly distributed to the gears and also upward to the pump shaft thrust bearing an agitator is provided. For this purpose a series of radially extended downwardly inclined peripheral scoops 109 are formed on the lower pinion 93. Consequently as this pinion rotates at high speed, the lubricant is lifted and thrown throughout the chamber and the gear box against all the pinions and bearings, including the thrust bearing at the top of the pump shaft.

While some lubricant tends to work down the pump shaft 69 and it is desirable for that purpose in order to lubricate the vertical bearings of the shaft, it is successively trapped by the bearing bushing 83, by the intermediate bearing 85 and finally by a narrow annular chamber 110 between the sleeve 75 and the tubular casing 79 so that in practice no excess reaches the water taken in by the pump.

It is of the greatest importance to the successful conditioning of the air in accordance with the principles of this invention that the conditioning liquid or water shall be discharged uniformly throughout the discharge area of the distributor therefrom in large volume and under heavy pressure so that the entire space within the air conditioning chamber shall be filled with a condition of the liquid resembling, as has been pointed out, a dense and violent rainstorm so that as the air is drawn upwardly therethrough, it cannot leave the chamber without being thoroughly cleansed of all impurities and without having imparted to it the required temperature and humidity conditions. In order to secure this result, the invention combines with the main centrifugal pump located at the bottom of the tank and acting to force the water upward in the conduit a booster pump located at the admission end of the distributor and acting to force water through the distributor to the further end thereof and out through the apertures 21 of the cylindrical distributing area in uniform volume and under uniform pressure. This distributor pump therefore takes the water rising vertically in the conduit under the action of the main pump and forces it horizontally through the distributor. For this purpose in the preferred form illustrated the invention provides a centrifugal pump herein shown as forming a part of the right-hand distributor head. This booster pump is formed as a part of the hub of the head 28, the intermediate section 111 of this hub being enlarged for this purpose. The intake opening 32 of the head extends through this enlarged section 111 and the annular wall of the hub thus formed is cut away to form the peripheral ports 112 separated by the curved wedge-shaped peripherally spaced blades 113. There is thus formed an impeller having a similar construction and performing a similar function to the impeller of the main centrifugal pump already described. Thus the water fed from the upper end of the conduit entering the intake 32 is acted upon by the centrifugal booster pump and forced throughout the distributor.

The effective air-conditioning chamber within which the distributor is located is partially closed at the top and bottom by a series of parallel baffle plates 114 mounted with their edges in an approximately vertical plane and spaced slightly apart laterally to form between them narrow passageways for the upward travel of the air. Preferably both sets of baffle plates are made alike and in each case each plate is formed between its edges with a plurality of lengthwise similar corrugations. In the case of the upper set of baffle plates, it is important that the generally vertical planes of these plates be parallel to a vertical plane through the axis of the distributor because the rotary action of the distributor tends to produce a whirling mass of liquid and with the baffle plates thus set there is no danger of the water being thrown vertically upward between the baffle plates. Consequently in practice while the lower baffle plates allow the gravitating mass of liquid to flow downward and return to the tank, the upper set acts as a separator and prevents entrained moisture being carried by the conditioned air through the fan and out of the discharge opening of the apparatus.

The entire apparatus thus described is preferably enclosed in a suitable cabinet, an example of which is illustrated in Fig. 7, which may be made of any suitable material, of pleasing shape and appearance, and provided with sound-insulating material, although the apparatus when in operation makes very little noise. This cabinet is shown as provided at the top with an opening 115 to align with the discharge opening of the fan casing 18. The cabinet is open at the bottom and supported at a sufficient distance from the floor as by the legs 116 to allow the air from the room or enclosure to enter the bottom of the cabinet and thence pass into the bottom or intake opening of the air-conditioning chamber. Small openings 117 are provided in the side wall for the connections to the electric motors shown.

While the apparatus may be made of various sizes depending upon the use to which it is to be put, it is exceedingly compact in form and performs its functions in a minimum amount of space. It is highly efficient in its principle of operation in conditioning a large volume of air by the rapid circulation of the water. While only a comparatively small volume of water is required in the tank, owing to the rapid circulation a very large volume is continuously presented to the air being conditioned and in such a form that the air is thoroughly washed or purified and quickly brought to the desired condition of temperature and humidity.

The tank may be located where most convenient, but is preferably associated directly with the remainder of the apparatus as herein described. The supply of water in this tank may be maintained in any desirable manner and obviously may be connected to a constant source of water supply. The temperature and humidity of the discharge air will, of course, depend upon the temperature and humidity of the air taken into the apparatus and the temperature of the water discharged into the conditioning chamber. The means for controlling the temperature of the water or other fluid in the tank are not a part of the present invention and may be of any suitable character. So also suitable instruments for indicating temperature and humidity conditions may be provided as desired. It will be understood that an increase in the temperature of water or other fluid acts to increase the humidity of the discharged and conditioned air, and that correspondingly a decrease in the temperature of this water or fluid acts to effect a dehumidification of the discharged and conditioned air. By greatly reducing the temperature of the water or by employing a fluid of low temperature, such, for example, as calcium chloride brine, the conditioned air may be employed as a refrigerating means.

The invention thus presents a very simple, practical, and efficient apparatus for air conditioning having a wide range of usefulness.

Having thus described the invention, what is claimed as new, and desired to be secured by Letters Patent, is:

1. In an air-conditioning apparatus having a chamber through which the air is drawn and in which it is conditioned, a water tank beneath the chamber, a perforated cylindrical rotary water distributor extending transversely of and within the chamber, a conduit opening at its lower end adjacent the bottom of the tank and at its upper end into the distributor, a rotary main pump located in the lower end of the conduit, a rotary booster pump at the upper end of the conduit, and means for simultaneously rotating said pumps and distributor to cause the water to be raised through the conduit and continuously discharged from all parts of the distributing area of the distributor to produce a dense, violent rainstorm effect in and throughout the chamber.

2. In an air-conditioning apparatus having the construction defined in claim 1, the combination of elements therein set forth in which the rotary main pump located in the lower end of the conduit is below the water level in the tank.

3. In an air-conditioning apparatus having a chamber through which the air is drawn and in which it is conditioned, a water tank beneath the chamber, a perforated cylindrical rotary water distributor extending transversely of and within the chamber, a conduit opening at its lower end adjacent the bottom of the tank and at its upper end into the distributor, a centrifugal main pump having its impeller rotating on a vertical axis and located in the lower end of the conduit, a rotary booster pump at the upper end of the conduit, and means for simultaneously rotating said pumps and distributor to cause the water to be raised through the conduit and continuously discharged from all parts of the distributing area of the distributor to produce a dense, violent rainstorm effect in and throughout the chamber.

4. In an air-conditioning apparatus having the construction defined in claim 3, the combination of elements therein set forth in which the rotary main pump located in the lower end of the conduit is below the water level in the tank.

5. In an air-conditioning apparatus having a chamber through which the air is drawn and in which it is conditioned, a water tank beneath the chamber, a horizontal shaft extending into the chamber and a vertical shaft exterior of the chamber and geared to the horizontal shaft, means for rotating one of said shafts and thereby simultaneously the other, a hollow perforated cylindrical water distributor closed at one end and mounted upon and to rotate coaxially with the horizontal shaft within the chamber, a centrifugal booster pump secured to the horizontal shaft to rotate therewith at the open end of the distributor, a centrifugal main pump on the lower end of the vertical shaft below the water level in the tank, and a conduit having an intake opening beneath the main pump and a discharge opening constituting the intake opening of the booster pump, the said elements acting to cause the water to be raised through the conduit and continuously discharged through the perforations of the water distributor to produce a dense violent rainstorm effect in and throughout the chamber.

6. In an air-conditioning apparatus having a chamber through which the air is drawn and in which it is conditioned, a water tank beneath the chamber, a rotary water distributor within the chamber, a conduit extending from adjacent the bottom of the tank to the distributor with the lower end of the conduit presenting a casing having a dome-shaped top with a vertical discharge opening from the side wall of the dome and a horizontal base having a central intake, a bridge plate and back pressure guard rigidly mounted above and parallel with the horizontal base and spaced at its periphery from the side wall of the dome top, a vertical shaft extending through the dome top and bridge plate, a centrifugal pump impeller mounted on the lower end of the vertical shaft extending parallel with and closely adjacent to the top of the horizontal base and the bottom of the bridge plate with its intake over the central intake of the base and its discharge ports opening at its periphery, and means for rotating the vertical shaft to cause the pump impeller to draw the water through the intake, expel it at its periphery over the periphery of the bridge plate into the casing chamber above the bridge plate and from thence upward in the conduit.

7. In an air-conditioning apparatus having the construction defined in claim 6, antifriction means for supporting the vertical shaft of the pump against downward thrust and means for accurately adjusting the shaft with respect to said antifriction means and to maintain the pump impeller accurately positioned with respect to the horizontal base and the bridge plate.

8. In an air-conditioning apparatus having a chamber through which the air is drawn and in which it is conditioned, a water tank beneath the chamber, a gear box, a horizontal shaft extending into the chamber and into the gear box, a vertical shaft exterior of the chamber extending into the gear box, a driving shaft extending into the gear box, gears in the gear box connecting said shafts to cause the simultaneous rotation of the horizontal and vertical shafts upon the rotation of the driving shaft, a water distributor and a centrifugal booster pump secured to and operated by the horizontal shaft, a centrifugal main pump on the lower end of the vertical shaft within the tank, and a conduit having an intake opening beneath the main pump and a discharge opening opposite the intake opening of the booster pump.

9. In an air-conditioning apparatus having the construction defined in claim 8, a lubricant agitator secured to and operated by one of said shafts within the gear box.

10. In an air-conditioning apparatus having the construction defined in claim 8, a lubricant agitator mounted concentrically on the vertical shaft within the gear box and presenting a plurality of radially extended downwardly inclined peripheral scoops.

11. In an air-conditioning apparatus having a chamber through which the air is drawn and in which it is conditioned, a water tank beneath the chamber, a rotary water distributor within the chamber, a conduit extending from adjacent the bottom of the tank to the distributor with the lower end of the conduit presenting a casing having a horizontal base with a central intake, a bridge plate and back pressure guard rigidly mounted above and parallel with the horizontal base and spaced at its periphery from the casing, a gear box, a vertical shaft extending into the gear box at its upper end and through the top of the casing and the bridge plate at its lower end, a centrifugal pump impeller mounted on the lower end of the vertical shaft extending parallel with and closely adjacent to the top of the horizontal base and the bottom of the bridge plate with its intake over the central intake of the base and its discharge ports opening at its periphery, a horizontal bearing on the gear box concentrically of the vertical shaft, an adjusting nut threaded to the upper end of the vertical shaft, an antifriction bearing between the said nut and bearing on the gear box, and means for positively locking the threaded nut in adjusted position on the shaft whereby the vertical shaft of the pump is supported against downward thrust and is accurately adjustable to position and maintain the pump impeller with respect to the horizontal base and the bridge plate.

12. In an air-conditioning apparatus having a chamber through which the air is drawn and in which it is conditioned, a water tank beneath the chamber, a rotary water distributor within the chamber, a conduit extending from adjacent the bottom of the tank to the distributor with the lower end of the conduit presenting a casing having a horizontal base with a central intake, a bridge plate and back pressure guard rigidly mounted above and parallel with the horizontal base and spaced at its periphery from the casing, a gear box, a vertical shaft extending into the gear box at its upper end and through the top of the casing and the bridge plate at its lower end, a centrifugal pump impeller mounted on the lower end of the vertical shaft extending parallel with and closely adjacent to the top of the horizontal base and the bottom of the bridge plate with its intake over the central intake of the base and its discharge ports opening at its periphery, a horizontal bearing on the gear box concentrically of the vertical shaft, an adjusting nut threaded to the upper end of the vertical shaft, an antifriction bearing between the said nut and bearing on the gear box, and a lock nut threaded to the upper end of the shaft above the adjusting nut, a vertical screw threaded in the lock nut and interengageable with the adjusting nut, and means for locking the lock nut against rotation on the shaft whereby the vertical shaft of the pump is supported against downward thrust and is accurately adjustable to position and maintain the pump impeller with respect to the horizontal base and the bridge plate.

13. In an air-conditioning apparatus having a chamber through which the air is drawn and in which it is conditioned, a water tank beneath the chamber, a rotary water distributor within the chamber, a conduit extending from adjacent the bottom of the tank to the distributor with the lower end of the conduit presenting a pump chamber having a horizontal base and a central intake, a bridge plate and back pressure guard rigidly mounted in the pump chamber above and parallel with the horizontal base and spaced at its periphery from the side wall of the pump chamber, a vertical shaft extending through the top of the pump chamber and the bridge plate, a centrifugal pump impeller mounted on the lower end of the vertical shaft extending parallel with and closely adjacent to the top of the horizontal base and the bottom of the bridge plate with the intake over the central intake of the base and its discharge ports opening at its periphery, the impeller acting when rotated to draw the water through the intake, expel it at its periphery over the periphery of the bridge plate into the pump chamber above the bridge plate and from thence vertically upward in the conduit.

14. An apparatus comprising a water tank, a conduit extending vertically from adjacent the bottom of the tank with its lower end presenting a casing having a dome-shaped top and a horizontal base with a central intake, a bridge plate and back pressure guard rigidly mounted above and parallel with the horizontal base and spaced at its periphery from the side wall of the dome top, the discharge opening from the casing being located in the dome top at one side thereof and above the bridge plate, a vertical shaft extending through the dome top and bridge plate, a centrifugal pump impeller mounted on the lower end of the vertical shaft extending parallel with and closely adjacent to the top of the horizontal base and the bottom of the bridge plate with its intake over the central intake of the base and its discharge ports opening at its periphery, and means for rotating the vertical shaft to cause the pump impeller to draw the water through the intake, expel it at its periphery over the periphery of the bridge plate into the casing chamber above the bridge plate and from thence vertically upward in the conduit.

15. An apparatus having the construction defined in claim 14, together with antifriction means for supporting the vertical shaft of the pump against downward thrust and means for accurately adjusting the shaft with respect to said antifriction means and to maintain the pump impeller accurately positioned with respect to the horizontal base and the bridge plate.

16. An apparatus having the construction defined in claim 14, together with a fixed horizontal bearing located concentrically of the vertical shaft near its upper end, an adjusting nut threaded to the upper end of the vertical shaft, an antifriction bearing between the said nut and the fixed bearing, and means for positively locking the threaded nut in adjusted position on the shaft whereby the vertical shaft of the pump is supported against downward thrust and is accurately adjustable to position and maintain the pump impeller with respect to the horizontal base and the bridge plate.

17. In an air-conditioning apparatus having a chamber through which the air is drawn and in which it is conditioned, a water tank beneath the chamber, a gear box, a horizontal shaft extending into the chamber and into the gear box, a vertical shaft exterior of the chamber extending into the gear box, a driving shaft extending into the gear box, gears in the gear box connecting said shafts to cause the simultaneous rotation of the horizontal and vertical shafts upon the rotation of the driving shaft, a water distributor and a centrifugal booster pump secured to and operated by the horizontal shaft, a centrifugar main pump on the lower end of the vertical shaft within the tank, and a conduit having an intake opening beneath the main pump and terminating at its upper end in a chamber in an extension of the gear box having a lateral discharge opening opposite the intake opening of the booster pump.

18. In an air-conditioning apparatus having the construction defined in claim 6, in which the horizontal base and the bridge plate are provided with opposed circular recesses into which the bottom and top, respectively, of the impeller project.

LENA A. WHITE,
*Executrix of the Last Will and Testament of Frederick White, Deceased.*